(No Model.) 3 Sheets—Sheet 1.

G. H. FENTON.
VEHICLE FOR TRANSPORTING HORSES AND OTHER ANIMALS.

No. 510,416. Patented Dec. 12, 1893.

Witnesses

Inventor
Gerald H. Fenton (No Model.) 3 Sheets—Sheet 2.

G. H. FENTON.
VEHICLE FOR TRANSPORTING HORSES AND OTHER ANIMALS.

No. 510,416. Patented Dec. 12, 1893.

Witnesses

Inventor (No Model.)  
3 Sheets—Sheet 3.

G. H. FENTON.
VEHICLE FOR TRANSPORTING HORSES AND OTHER ANIMALS.

No. 510,416. Patented Dec. 12, 1893.

Witnesses  
Inventor

UNITED STATES PATENT OFFICE.

GERALD HERBERT FENTON, OF BANGALORE, INDIA.

VEHICLE FOR TRANSPORTING HORSES AND OTHER ANIMALS.

SPECIFICATION forming part of Letters Patent No. 510,416, dated December 12, 1893.

Application filed April 28, 1893. Serial No. 472,250. (No model.) Patented in England September 3, 1892, No. 15,862, and in India March 30, 1893, No. 318.

*To all whom it may concern:*

Be it known that I, GERALD HERBERT FENTON, veterinary surgeon, a subject of the Queen of Great Britain and Ireland, residing at Station Veterinary Hospital, Bangalore, Madras, India, have invented Improvements in Vehicles or Floats for the Conveyance of Horses and other Animals, (and which was patented in Great Britain, September 3, 1892, No. 15,862, and in India, No. 318 of 1891, dated March 30, 1893,) of which the following is a specification.

A vehicle or float for the conveyance of horses and other animals according to this invention is mounted and balanced upon two wheels and in order to allow of the employment of draft animals of different heights the draft pole is adjustably secured in a socket by pins passing through holes in the sides of the said socket, several such holes being provided at different heights. The body of the vehicle or float is supported on side springs and comprises a frame of bars of metal such as iron, of angle, T, or other suitable section, to which the sides and floor are secured; front and rear doors; a roof formed of canvas stretched on hoops and battens; and a floor formed of planks situated about half an inch apart to allow of drainage.

Figure 1:
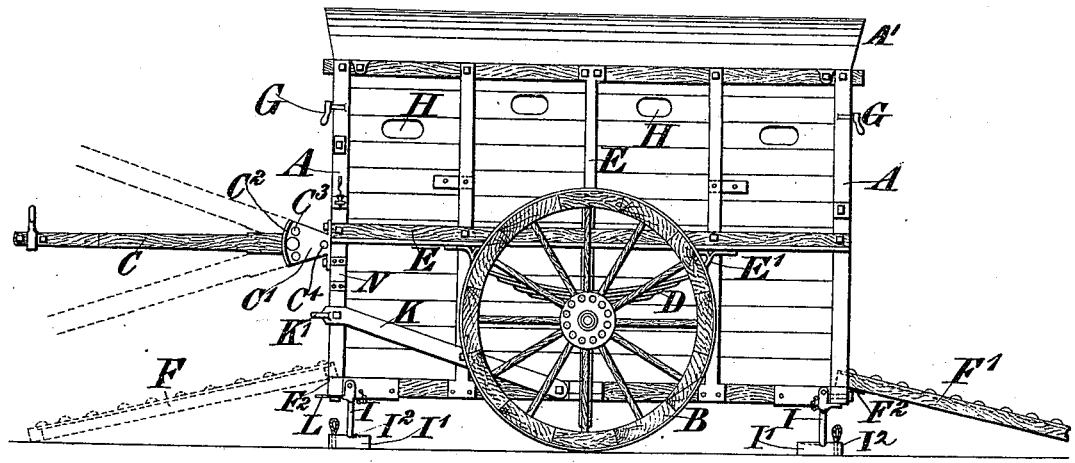
Figure 2:
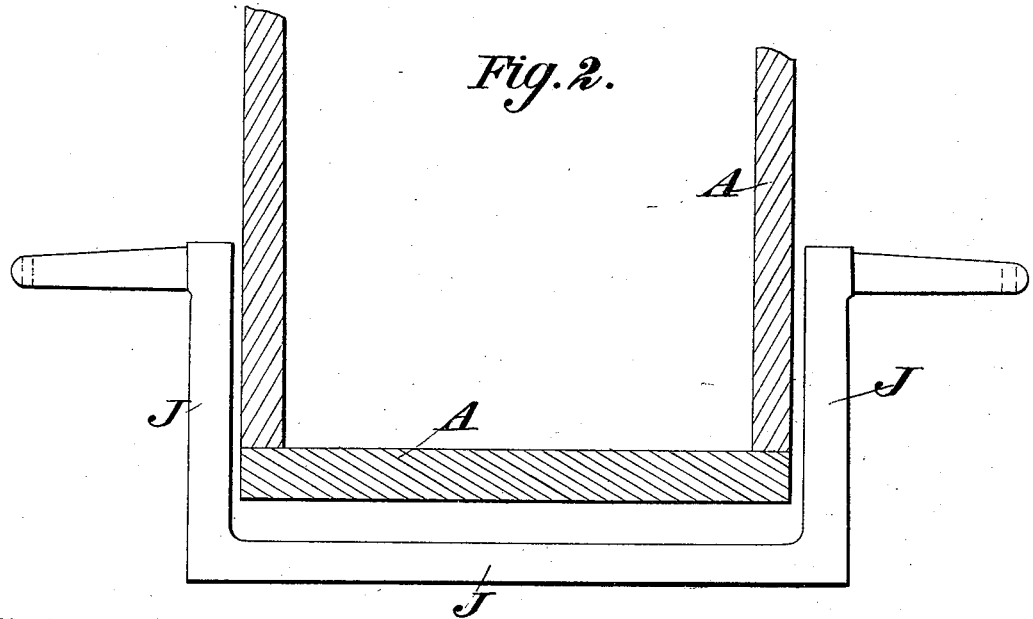
Figure 3:
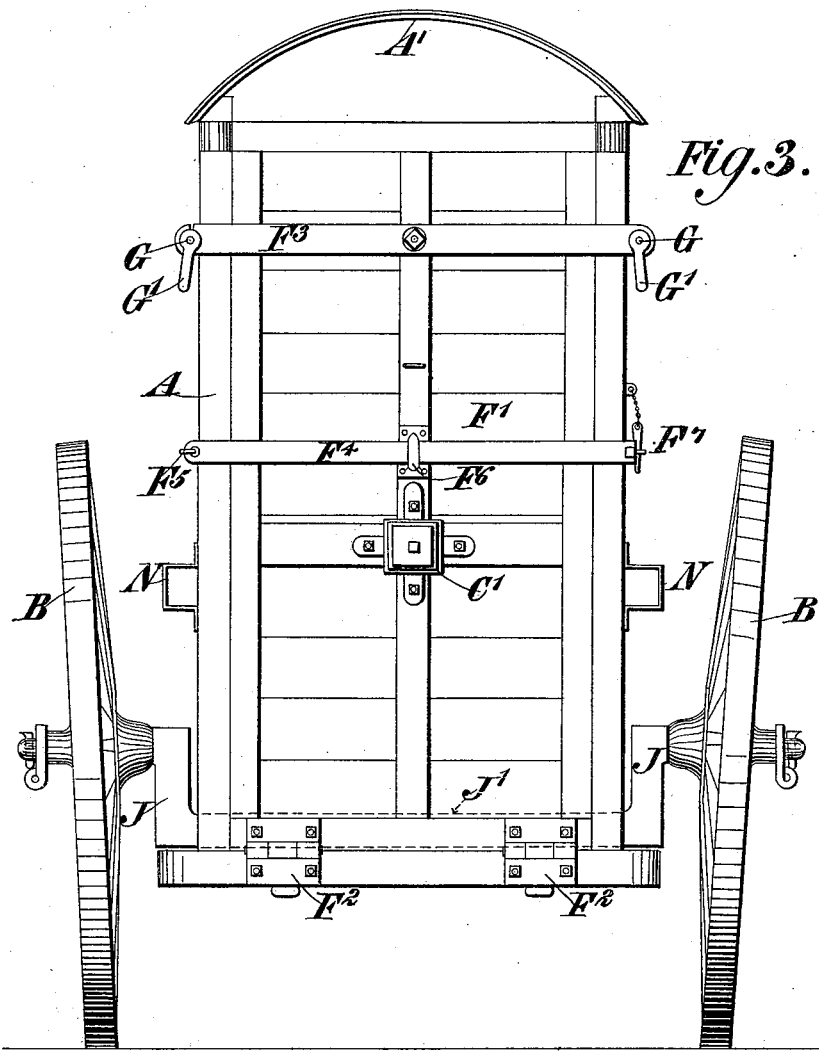
Figure 4:
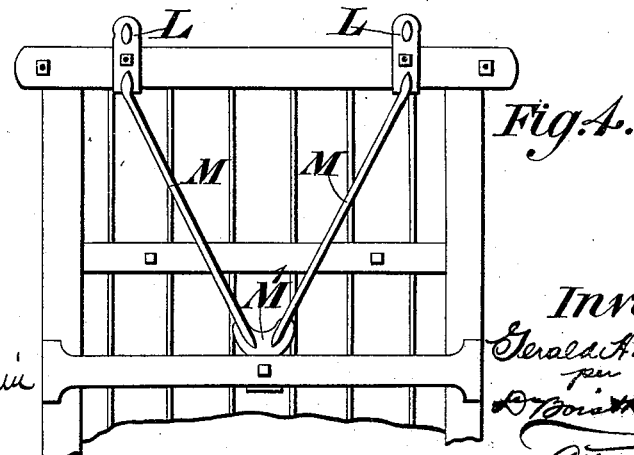
Figure 5:
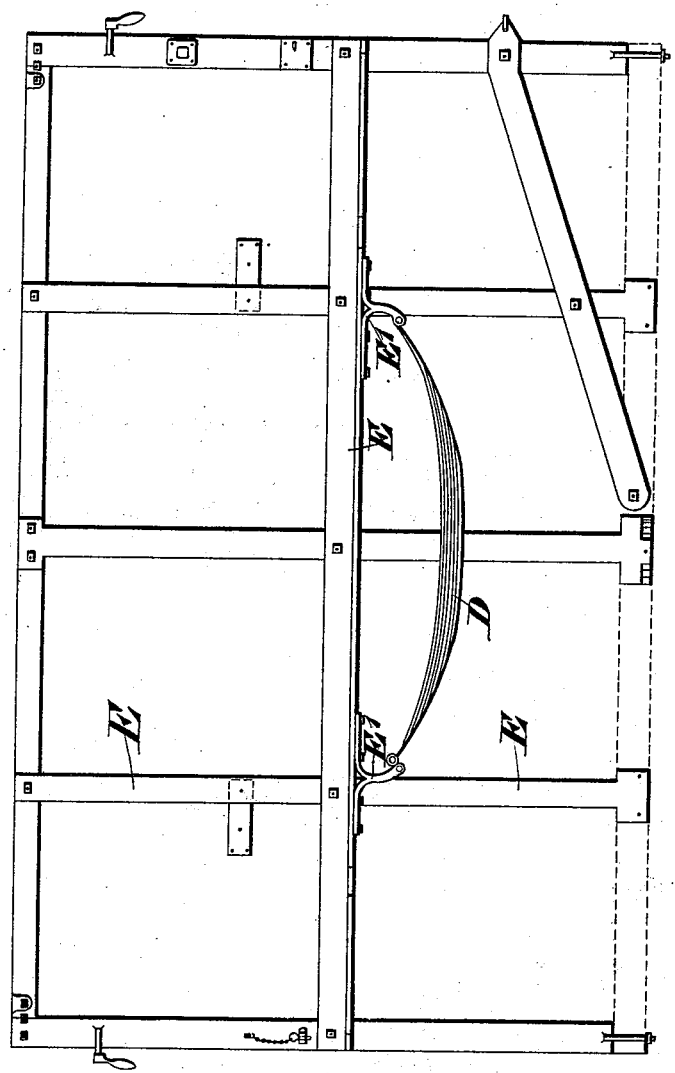

In the accompanying drawings, Figure 1 is a side elevation of one form of vehicle or float according to this invention. Fig. 2 is a part section of Fig. 1 to a larger scale showing the arrangement of axle. Fig. 3 is an end elevation illustrating a modification, the axle passing through the interior of the vehicle in order to give greater clearance from ground in rough country. Figs. 4 and 5 are detail views hereinafter referred to.

A is the body and A' the roof of the vehicle or float. B B are the wheels thereof; these wheels are all made to a standard pattern; preferably the "Royal Artillery India pattern" to facilitate their renewal in case of damage.

C is the draft pole which is secured in the socket C' by the pins $C^2$ and $C^4$ several holes $C^3$ being formed for the said pin $C^2$ to permit of the pole being adjusted to different heights. The pole C is centered on pin $C^4$ and the other end can be elevated or depressed according to position of pin $C^2$ in holes $C^3$ as indicated in dotted lines in Fig. 1. This socket C' is secured to the front door, and the removability of the pole enables the said door to be turned down with facility.

D, D are the springs which are connected at their ends to horizontal bars in the frame E, by scroll irons E' thereon. The said frame E forms a support for the wood-work and serves to take the strain due to the carrying of a load. The construction of this framework is shown in Figs. 1 and 5 the latter being a separate detail view thereof to a larger scale with the wood-work of the vehicle removed.

F, F' are respectively the front and rear doors. They are hinged at their lower edges at $F^2$ and can be turned down as indicated to form inclines for facilitating the entrance and exit of the animal. By this arrangement the animal can be admitted at one end and removed at the other thereby obviating any difficulty from backing the horse out. When closed up the said doors are secured by cross bars $F^3$ and $F^4$. The former of these is slotted or recessed at its end to allow it to pass over screwed bolts G secured to the metal frame of the vehicle or float, and having nuts provided with handles G' for securely fixing the said bar. The other cross bar $F^4$ is swiveled on a ring $F^5$ at one end, and rests in a hook or support $F^6$ being secured at the other end by a pin and hasp $F^7$.

H, H, are suitable ventilation openings or apertures provided with canvas blinds and formed in the sides.

I, I are props or stays provided to support the vehicle in an upright position during the entrance or exit of the horse or other animal, and I are shoes with grooves or recesses $I^2$ which can be placed under the said props to prevent them sinking into the ground. These props and shoes may be secured to the vehicle in any convenient manner.

In the arrangement shown in Figs. 1 and 2 the wheels are mounted on a crank axle the vertical parts or webs J of which extend down the sides of the vehicle and the central or horizontal portion J' extends across the vehicle, passing beneath the floor of the same. Where however the vehicle is to be used in rough country the modification illustrated in Fig. 3 is employed. In this case the said horizontal portion J' passes through the sides of the vehicle and across the upper side of the floor so as to prevent its accidentally coming in contact with obstructions beneath the vehicle. When thus arranged inside the vehicle the said axle has a protective covering of suitable material such as hair matting.

Bars K, K, extending in an inclined direction down the sides of the vehicle or float have hooks K' which carry the single tree to which the draft chains are secured. For bullock traction the single tree is secured to rings or suitable fastenings L L secured along the lower edge of the vehicle to bars M extending under the bottom of the vehicle and meeting in a socket piece M' at their inner ends as indicated in detail in Fig. 4, so forming a V-shaped stay.

When a single horse only is to be employed for drawing the vehicle the draft pole may be removed and a pair of shafts employed the vehicle being for this purpose provided with sockets N (Fig. 1) to receive the said shafts.

Within the vehicle on each side is a padding of suitable material such as leather, which is made removable so as to facilitate disinfection, and the wood work is varnished with the same object.

The vehicle or float is supplied with various accessories such as a water bucket, a feeding blanket, lamp sockets and a grease tin. It is also provided with a breast band and breeching to prevent the horse swerving to and fro; horizontal bars near the roof with hooks thereon for the feeding blanket and for slings, these bars being secured inside the vehicle by bolts passing through the sides and through the metal frame so as to transmit the strains to the said frame; drag ropes for pulling the vehicle up hill and holding it back down hill; and hobbles for the horse's feet secured by ropes to rings in the floor of the vehicle.

The driver's seat is preferably secured to the front door and made removable.

In some cases one or more bars of metal such as iron may be provided between the sides at the top of the vehicle to prevent or guard against collapse of the sides in case of accident.

The vehicle or float constructed according to this invention is specially suitable for removing sick, lame, injured or exhausted horses to their respective hospitals whether on field days or on active service as well as for use in any case of accident to horses in the street, race course or hunting field.

What I claim is—

1. The combination in a vehicle or float for the conveyance of horses and other animals, of a vehicle body mounted and balanced upon two wheels, a vertically adjustable draft pole to suit animals of different heights, and end doors capable of being turned down to serve as inclined ways for animals entering and leaving said vehicle or float substantially as described.

2. The combination in a vehicle or float for the conveyance of horses and other animals, of a vehicle body having a metal frame and mounted and balanced upon two wheels, a vertically adjustable draft pole to suit animals of different heights, and front and rear doors capable of being turned down to serve as inclined ways for animals entering and leaving said vehicle or float substantially as described.

3. The combination in a vehicle or float for the conveyance of horses and other animals, of a body mounted and balanced upon two wheels, a metal frame for said body adapted to take the strain due to the carrying of a load, a vertically adjustable draft pole to suit animals of different heights, front and rear doors which are capable of being turned down to serve as inclined ways, and props or stays adapted to support said vehicle or float in an upright position substantially as described.

4. The combination in a vehicle or float for horses and other animals, of a body A, a metal frame E to which the sides and floor of said body are secured, a crank axle with wheels B, B, springs D arranged between said frame and crank axle, a draft pole C, a socket C', wherein draft pole is secured by a fixed pin $C^4$ and a pin $C^2$ that is adjustable in said socket, and front and rear doors F hinged to said body substantially as described.

5. The combination in a float for horses and other animals, of a body A having a roof A', and ventilation openings H at the side, a crank axle with wheels B, socket C' with pins $C^2$ $C^4$, whereof $C^2$ is vertically adjustable in said socket, a draft pole C secured by said pins in said socket, props I connected to said vehicles, shoes I' adapted to receive and support said props, and a V-shaped stay formed of bars M connected at their inner ends and each terminating at its outer end in a ring or fastening L said stay being secured to the under side of said vehicle so as to take the strain of traction substantially as described.

6. The combination in a vehicle or float for horses and other animals, of a body A with metal frame E and bars K and M for taking the strain of traction, a crank axle comprising vertical webs J and horizontal portion J', wheels B mounted on said crank axle, springs D arranged between said metal frame and crank axle, front and rear doors F F' hinged at their lower ends to said body and adapted when turned down to serve as inclined ways, cross bars $F^3$ $F^4$ and bolts G for securing said doors in their closed positions, a socket C' secured to the front door F, and a draft pole C adjustably fixed in said socket substantially as described.

In testimony whereof I have signed my name to this specification in the presence of two subscribing witnesses.

GERALD HERBERT FENTON.

Witnesses:
B. T. RAMAHIOFUN,
M. VENCATASAWNEY.
*Hony. Magistrates.*